(12) United States Patent
Casal et al.

(10) Patent No.: US 12,022,024 B2
(45) Date of Patent: *Jun. 25, 2024

(54) SYSTEMS AND METHODS EMPLOYING GRAPH-DERIVED FEATURES FOR FRAUD DETECTION

(71) Applicant: PINDROP SECURITY, INC., Atlanta, GA (US)

(72) Inventors: Ricardo Casal, Atlanta, GA (US); Theo Walker, Atlanta, GA (US); Kailash Patil, Atlanta, GA (US); John Cornwell, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,897

(22) Filed: Apr. 17, 2023

(65) Prior Publication Data
US 2023/0254403 A1 Aug. 10, 2023

Related U.S. Application Data

(63) Continuation of application No. 17/201,849, filed on Mar. 15, 2021, now Pat. No. 11,632,460.
(Continued)

(51) Int. Cl.
*H04M 3/22* (2006.01)
*G06F 18/214* (2023.01)
(Continued)

(52) U.S. Cl.
CPC ........ *H04M 3/2281* (2013.01); *G06F 18/214* (2023.01); *G06N 20/00* (2019.01);
(Continued)

(58) Field of Classification Search
CPC ......... H04M 3/2281; H04M 2203/551; H04M 2203/556; H04M 2203/6027;
(Continued)

(56) References Cited

U.S. PATENT DOCUMENTS

| 5,414,809 A | * | 5/1995 | Hogan | .................. G06F 16/248 715/765 |
| 6,289,084 B1 | * | 9/2001 | Bushnell | ............. H04M 1/2746 379/207.15 |

(Continued)

OTHER PUBLICATIONS

Examiner Report No. 1 on AU Application 2021239845 dated Mar. 1, 2023 (4 pages).
(Continued)

*Primary Examiner* — Lisa Hashem
(74) *Attorney, Agent, or Firm* — Foley & Lardner LLP

(57) ABSTRACT

Embodiments described herein provide for performing a risk assessment using graph-derived features of a user interaction. A computer receives interaction information and infers information from the interaction based on information provided to the computer by a communication channel used in transmitting the interaction information. The computer may determine a claimed identity of the user associated with the user interaction. The computer may extract features from the inferred identity and claimed identity. The computer generates a graph representing the structural relationship between the communication channels and claimed identities associated with the inferred identity and claimed identity. The computer may extract additional features from the inferred identity and claimed identity using the graph. The computer may apply the features to a machine learning model to generate a risk score indicating the probability of a fraudulent interaction associated with the user interaction.

20 Claims, 9 Drawing Sheets

Related U.S. Application Data

(60) Provisional application No. 62/990,909, filed on Mar. 17, 2020.

(51) Int. Cl.
| | |
|---|---|
| *G06N 20/00* | (2019.01) |
| *G06N 3/08* | (2023.01) |
| *G06N 20/10* | (2019.01) |
| *G06N 20/20* | (2019.01) |
| *H04M 3/42* | (2006.01) |
| *H04M 3/51* | (2006.01) |

(52) U.S. Cl.
CPC .............. *G06N 3/08* (2013.01); *G06N 20/10* (2019.01); *G06N 20/20* (2019.01); *H04M 3/42042* (2013.01); *H04M 3/51* (2013.01); *H04M 2203/551* (2013.01); *H04M 2203/556* (2013.01); *H04M 2203/6027* (2013.01)

(58) Field of Classification Search
CPC ... H04M 3/42042; H04M 3/51; G06F 18/214; G06N 20/00; G06N 3/08; G06N 20/10; G06N 20/20
See application file for complete search history.

(56) References Cited

U.S. PATENT DOCUMENTS

| | | | | |
|---|---|---|---|---|
| 7,023,979 | B1 | 4/2006 | Wu et al. | |
| 8,583,750 | B1 | 11/2013 | Hewinson | |
| 8,607,355 | B2 | 12/2013 | Baughman | |
| 8,837,687 | B2* | 9/2014 | Odinak | G10L 15/30 455/563 |
| 8,918,904 | B2* | 12/2014 | Sanin | G06Q 20/4014 726/19 |
| 9,883,040 | B2* | 1/2018 | Strong | G06F 21/552 |
| 9,930,186 | B2* | 3/2018 | Bandyopadhyay | H04W 12/12 |
| 10,362,172 | B2* | 7/2019 | Strong | H04M 15/41 |
| 10,666,792 | B1* | 5/2020 | Marzuoli | H04M 3/436 |
| 10,873,461 | B2* | 12/2020 | Gupta | H04L 9/3013 |
| 10,902,105 | B2* | 1/2021 | Strong | H04M 3/527 |
| 11,355,103 | B2* | 6/2022 | Rao | G10L 25/27 |
| 11,495,244 | B2* | 11/2022 | Looney | G10L 15/22 |
| 11,632,460 | B2* | 4/2023 | Casal | H04M 3/51 379/32.01 |
| 2003/0112944 | A1 | 6/2003 | Brown et al. | |
| 2010/0241634 | A1 | 9/2010 | Madhok | |
| 2012/0021730 | A1 | 1/2012 | Vendrow | |
| 2012/0079454 | A1 | 3/2012 | Kwan et al. | |
| 2012/0316981 | A1 | 12/2012 | Hoover et al. | |
| 2014/0237570 | A1 | 8/2014 | Shishkov et al. | |
| 2015/0142626 | A1* | 5/2015 | Benouarets | G06Q 40/00 705/35 |
| 2015/0358459 | A1 | 12/2015 | Spievak et al. | |
| 2017/0111515 | A1 | 4/2017 | Bandyopadhyay et al. | |
| 2019/0141183 | A1 | 5/2019 | Chandrasekaran et al. | |
| 2023/0209351 | A1* | 6/2023 | Djankovic | H04W 12/48 455/411 |
| 2023/0216967 | A1* | 7/2023 | Murali | H04M 15/00 455/406 |

OTHER PUBLICATIONS

International Preliminary Report on Patentability for PCT Appl. Ser. No. PCT/US2021/022345 dated Sep. 29, 2022 (7 pages).

International Search Report and Written Opinion issued on PCT Appl. Ser. No. PCT/US2021/022345 dated Jun. 11, 2021 (7 pages).

Notice of Allowance on U.S. Appl. No. 17/201,849 dated Dec. 20, 2022 (10 pages).

Phithakkitnukoon et al., "Behavior based adaptive call predictor", ACM Transactions on Autonomous and Adaptive Systems, 6(3) Art 21, Sep. 2011, Retrieved on May 9, 2021 (29 pages) from <https://dl.acm.org/doi/abs/10.1145/2019583.2019588>.

U.S. Non Final Office Action on U.S. Appl. No. 17/201,849 dated May 25, 2022 (9 pages).

Examiner's Requisition for CA App. 3,171,476, dated Sep. 22, 2023 (4 pages).

Extended European Search Report dated Mar. 15, 2024 for EPO App. 21771023.5 (8 pages).

\* cited by examiner

SYSTEMS AND METHODS EMPLOYING GRAPH-DERIVED FEATURES FOR FRAUD DETECTION

CROSS-REFERENCE TO RELATED APPLICATIONS

This application is a continuation of U.S. application Ser. No. 17/201,849, filed Mar. 15, 2021, which claims priority to U.S. Provisional Application No. 62/990,909, filed Mar. 17, 2020, each of which is incorporated by reference in its entirety.

TECHNICAL FIELD

This application relates generally to methods and systems for fraud detection using graph-derived features.

BACKGROUND

Fraudsters often target multiple unrelated targets in similar ways. In telecommunications and related technologies (such as voice-over-IP (VoIP)) a fraudster may attack targets by spoofing caller identification (e.g., a caller number and/or name). The convergence of IP (Internet protocol) and telephony, makes it easier for fraudsters to spoof caller identification without being detected by the callee. Normally, a genuine callee can be identified by an automatic number identification (ANI) or phone number, but the fraudster may claim to be a user by spoofing the user's ANI.

In internet networking, a fraudster may attack targets by manipulating a user's IP address. Normally, a genuine IP address (e.g., not fraudulent IP addresses) is used to identify network hardware connected to a network, but the fraudster may manipulate the user's IP address by creating virtual private networks (VPNs) to simulate the user's hardware being connected to a network.

Fraudulent attacks are often based on a history of attacks in which the fraudster collects information, commits fraud, or attempts to commit fraud. As the sophistication of threats that target sensitive data and critical systems grows, the importance of robust security mechanisms becomes even more important. Fraud detection is key to ensure that a request that claims to come from a certain source indeed does come from that source. As such, there remains a desire to improve the accuracy of fraud detection by leveraging the repetitive nature of fraudulent attacks.

SUMMARY

For the aforementioned reasons, there is a need for an efficient computer-implemented system and method for detecting fraud in real-time (or near real-time). Embodiments disclosed herein provide an efficient way to enhance security of an ongoing or upcoming user interaction. Specifically, embodiments disclosed herein describe a mechanism of fraud detection using graph-derived features. When a callee receives a call from a caller, a server generates a graph identifying the structural relationship between the communication channel (e.g., a channel configured to support internet networking, telecommunications networking, and the like) and the claimed identity of the caller. The server derives features from the graph and uses the graph features together with additional information such as metadata associated with the communication channel and/or metadata associated with the claimed identity in order to obtain a riskiness measure for a new or incoming interaction.

For example, a server may generate a graph based on each interaction between a user and a provider (e.g., a provider of a user account). The server may interpret the graph in the context of a larger graph to predict the riskiness of a particular interaction given other historic interactions. Each interaction, the server may query a provider database or an analytics database for historic inferred identities and/or inferred claims associated with the inferred identities. The historic inferred identities and inferred claims associated with the inferred identity are associated with the current interaction. The server builds a graph where nodes represent the inferred identity and/or inferred claims information, and edges represent the connections (or interactions) between the nodes. Unlike conventional methods, which may analyze a first degree connection between inferred identity-inferred claim pairs, the fraud detection method described herein assesses an entire shape of the graph and analyzes nodes and edges within the graph with particular features.

The server may receive interaction information associated with a user interaction. The server may obtains an inferred identity of the user using the interaction information. For example, a communication channel used to transmit the interaction information to the server may passively label the interaction information as part of one or more transmission protocols, creating information that the server uses to obtain the inferred identity of the user. The server may also obtain an identity claim associated with the user involved in the interaction based on a user input associated with the interaction. The server may extract features associated with the inferred identity and/or identity claim information. The server may generate a graph using the inferred identity and identity claim information, and any associated inferred identity and identity claim information. The server may annotate the graph using the features associated with the inferred identity and/or identity claim and extract additional features from the graph and annotated information. The server may apply the graph-derived features to a machine learning model to generate a risk score indicating the probability that the interaction is a fraudulent interaction.

In one embodiment, a computer-implemented method for assessing a risk of fraud comprises obtaining, by a computer, an inferred identity from inbound call data associated with an inbound call and an inbound caller; obtaining, by the computer, an identity claim associated with the inbound caller; extracting, by the computer, a first set of features from the inbound call data; generating, by the computer, a graph structure based upon the inferred identity, the identity claim, a set of prior inferred identities, and a set of prior identity claims associated with the inbound call; extracting, by the computer, a second set of features from the graph structure; and applying, by the computer, a machine learning model on the first set of features and the second set of features to generate a risk score for the inbound call.

In another embodiment, a system comprises a database comprising non-transitory memory configured to store prior call data; and a server comprising a processor configured to: obtain an inferred identity from inbound call data associated with an inbound call and an inbound caller; obtain an identity claim associated with the inbound caller; extract a first set of features from the inbound call data; generate a graph structure based upon the inferred identity, the identity claim, a set of prior inferred identities, and a set of prior identity claims associated with the inbound call; extract a second set of features from the graph structure; and apply a machine leaning model on the first set of features and the second set of features to generate a risk score for the inbound call.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
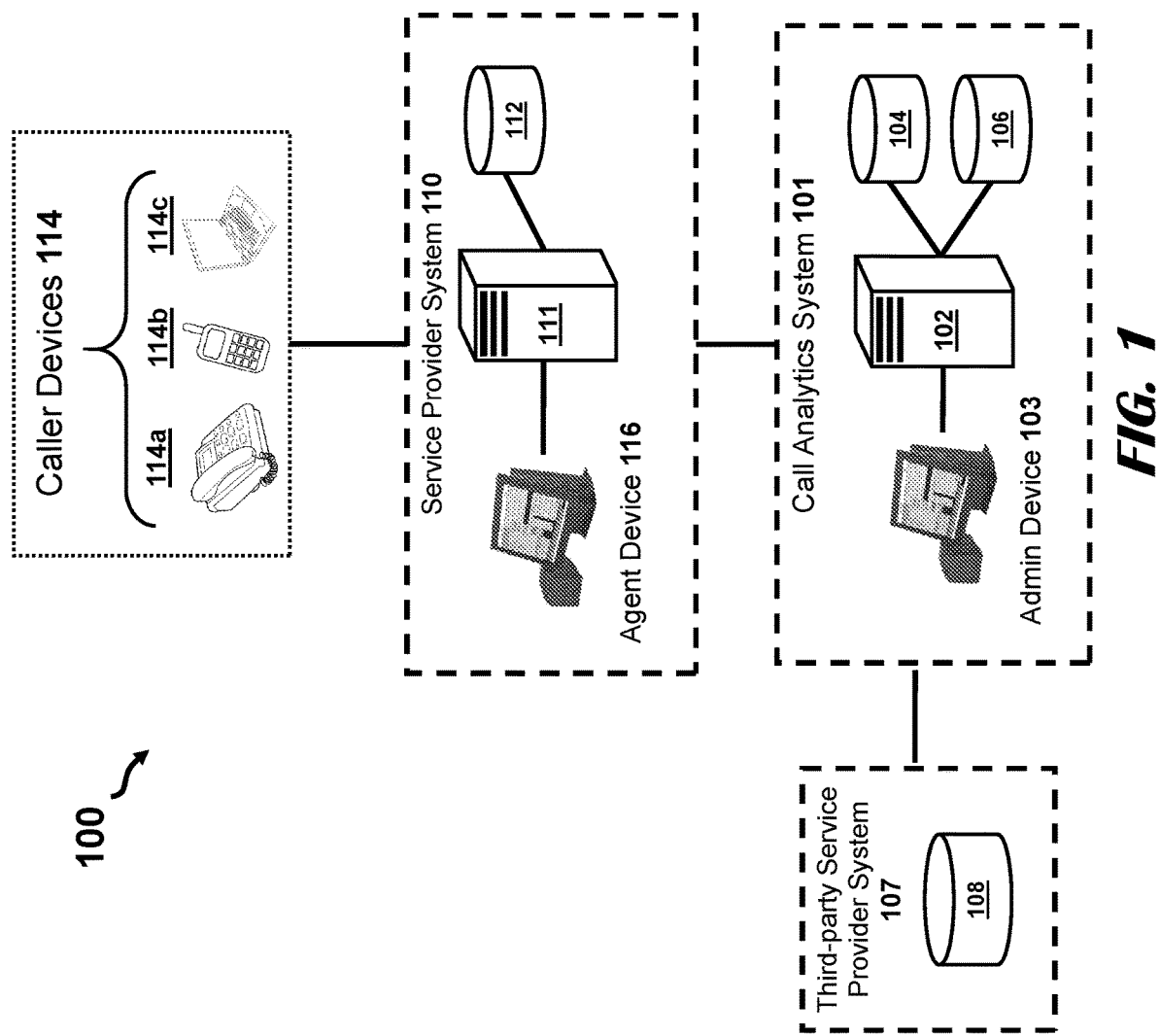
FIG. 1 illustrates components of a system for receiving and analyzing telephone calls, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a mechanism of detecting fraud in an interaction. A user may interact with their account using various channels of a provider, such as visiting a physical provider location, calling the provider, using the internet to access the provider's website, or interacting with the provider's smartphone application. A computer may represent a relationship between communication channels and claimed identifies in order to derive connections and similarities between user interactions to obtain a riskiness measure for a new (or upcoming) interaction.

A node represents an identity that is assigned passively from the communication channel (called an inferred identity). For example, an inferred identity in a telephony communication channel may be an ANI, a device ID, the IMEI, originating switch, originating trunk, Jurisdiction Information Parameter (JIP), Originating Line Information (OLI), a P-Asserted-Identity value, and Caller ID, and the like. An inferred identity in an internet networking channel may be an IP address, cookies, MAC addresses, and the like. Generally, inferred identity is the information associated with the protocol of a particular communication channel. Inferred identity data may also be data derived, calculated, inferred or otherwise determined by the computer and include a user's country, region, city, latitude and longitude, time zone, connection speed, internet service provider, voice biometric features, a line type (e.g., cellular, landline, VoIP), and the like. For example, the computer may use a Caller ID or other types of carrier metadata of a telephone call to determine the carrier or geographic location originating the telephone call.

The node may also represent an identity that is claimed by the user (called an identity claim). To claim or assume an identity, the user may perform an action. For example, the user may provide an account identifier, a social security number, a personal identifier, a credit card/debit card number, and the like. The manner of providing the account identifier may vary depending on the channel (e.g., spoken, typed, dual-tone multi-frequency (DTMF) tones, written down by an agent).

An edge of the graph, connecting the nodes in the graph, represents a communication interaction between a user and a provider, the provider providing an account to a user. In particular, the edge of the graph indicates an inferred identity and identity claim pair (II-IC pair). The communication interaction (the edge) is associated with an inferred identity and identity claim pair (II-IC pair) determined prior to, or during, the communication interaction. In some configurations, based on the information provided from the provider, the fraud detection mechanism may utilize additional metadata, personal user information, and/or previous fraud related features in predicting the fraud associated with a current (or ongoing) interaction. The nodes and edges of the graph may be annotated with additional information, such as inferred identity metadata, identity claim metadata, and historical risk related information (fraudulent interactions, high risk interactions, genuine interactions).

The embodiments described herein recite generating a risk score using graph-derived features of an inbound call and evaluating the likelihood that the inbound call is fraudulent or not-fraudulent. In other configurations, the risk score may be also be a verification score or authentication score that is compared to a verification threshold (e.g., a threshold representing the credibility associated with the interaction), rather than a fraud risk threshold (e.g., a threshold representing the fraud associated with the interaction). As another example, labels may indicate whether values of II-IC pairs are (or were in the past) associated with fraudulent or non-fraudulent calls. Labels may additionally or alternatively indicate whether II-IC pairs are (or were) associated with verified calling devices.

For ease of description and understanding, the embodiments described herein mention employing such technology in the context of telephony systems. But, the technology is not limited to such implementations, and may be employed for any number of uses that may benefit from fraud detection such as online commercial transactions using a web browser.

FIG. 1 illustrates components of a system 100 for receiving and analyzing telephone calls, according to an embodiment. The system 100 comprises a call analytics system 101, service provider system 110 of customer enterprises (e.g., companies, government entities, universities), third-party service provider system 107, and caller devices 114 (e.g., landline phone 114a, mobile phone 114b, and computing device 114c). The call analytics system 101, service provider system 110, and third-party service provider system 107 are network system infrastructures 101, 110, 107 comprising physically and/or logically related collection of devices owned or managed by some enterprise organization, where the devices of each infrastructure 101, 110, 107 are configured to provide the intended services of the particular infrastructures 101, 110, 107 and responsible organization. The call analytics system 101 includes analytics servers 102, analytics databases 106, records database 104, and admin devices 103. The service provider system 110 includes call center servers 111, call center databases 112, and agent devices 116. The third-party service provider system 107 includes telephony database 108.

Embodiments may comprise additional or alternative components, or omit certain components from what is shown in FIG. 1, yet still fall within the scope of this disclosure. For ease of description, FIG. 1 shows only one instance of various aspects the illustrative embodiment. However, other embodiments may comprise any number of components. For instance, it will be common for there to be multiple service provider system 110, or for a call analytics system 101 to have multiple analytics servers 102. Although FIG. 1 shows the system 100 having only a few of the various components, embodiments may include or otherwise implement any number of devices capable of performing the various features and tasks described herein. For example, in the system 100, an analytics server 102 is shown as a distinct computing device from an analytics database 106; but in some embodiments the analytics database 106 may be integrated into the analytics server 102, such that these features are integrated within a single device.

The various components of the system 100 may be interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., service provider system 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The call analytics system 101 is operated by a call analytics service that provides, for example, various call management, security (e.g., fraud detection), authentication, and analysis services to service provider system 110 of customer organizations. When caller devices 114 originate telephone calls, call data (e.g., inferred identity data) for the telephone calls is generated by components of telephony networks and carrier systems, such as switches and trunks, as well as caller devices 114. During the call, the callee may provide user data (e.g., identity claim data) associated with the user's account maintained by the service provider system 110. Both the call data and user data (e.g., II-IC pairs) can be forwarded to, or otherwise received by, the call analytics system 101. Components of the call analytics system 101, such as the analytics server 102, build a graph representing the structure and similarity of current II-IC pairs and historic II-IC pairs using the call data and user data obtained during the call in order to provide various call analytics services, such as providing a risk score, to customers of the call analytics system 101.

A third-party service provider system 107 is operated by a third-party organization offering telephony services to organizations such as the call analytics system 101. In FIG. 1, the third-party telephony service is a separate company from the call analytics service, though it is not required; the third-party service may be a separate company or a sibling entity of a common parent entity. In some embodiments, there may not be a third-party, but rather the call analytics system 101 may comprise the hardware and software components of the third-party service provider system 107 described herein. The third-party telephony service hosting the telephony database 108 is a company or other entity offering an administrative or overhead service of the nationwide or global telecommunications system. The third-party telephony service may provide a directory or telecommunications data management service that hosts telephony database 108 storing data of a variety types associated with any number of entities or people.

Telephony database 108 stores information about, for example, calling devices 114 and other information about telecommunications systems and devices (e.g., inferred identity data). The call analytics system 101 may query the telephony database 108 according to the call data received with or derived from calling devices 114 during telephone calls, such as an ANI or Caller ID received with a current call. The information retrieved from the telephony database 108 may be, for example, various information known to be (by registration) or otherwise frequently associated with the Caller ID or ANI. For example, the analytics server 102 may query a telephony database 108 using an ANI to retrieve certain inferred identity information (e.g., line type, carrier, location). In some implementations, derived Caller ID metadata may be stored or cached into a call records database 104 or analytics database 106 for quicker access by the analytics server 102.

The telephony database 108 may be hosted on any computing device comprising one or more processors and software, and capable of performing the various processes and tasks described herein. As shown in FIG. 1, the telephony database 108 may be hosted on a single computing device, but the telephony database 108 may be hosted on any number of computing devices.

The service provider system 110 is operated by a provider organization (e.g., corporation, government entity) that is a customer of the call analytics service. An example of a service provider system 110 is a call center. Service provider system 110 may receive telephone calls from callers who are consumers or users of services offered by the provider organizations. Call data received with phone calls may be captured by devices of service provider system 110 and forwarded to the call analytics system 101 via one or more networks. User data received by the service provider system 110 during the call will also be forwarded to the call analytics system 101. For instance, a bank may operate a service provider system 110 to handle calls from consumers regarding accounts and product offerings. As a customer of the call analytics service, the bank's service provider system 110 forwards captured call data and user data to the call analytics system 101, which may determine risk scores of calls on behalf of the bank.

Computing devices of service provider system 110, such as call center servers 111, may be configured to collect call data (and user data) generated during phone calls between caller devices 114 and the service provider system 110 and forward the call data to the call analytics system 101 via one or more networks. In some cases, the call center server 111 may forward the call data according to preconfigured triggering conditions or in response to receiving an incoming phone call. In some cases, the call center server 111 may forward the call data to the call analytics system 101 in response to instructions or queries received from another device of the system 100, such as an agent device 116, analytics server 102, or admin device 103.

In some embodiments, the call center server 111 may host and execute software processes and services for managing a call queue and/or routing calls made to the service provider system 110, which may include routing calls to an appropriate call center agent. The call center server 111 may provide information about the call, caller, and/or calling device 114 to an agent device 116 of the call center agent, where certain information may be displayed to the call center agent via a GUI of the agent device 116. Additionally or alternatively, the call center server 111 may host and execute software processes for processing an incoming call. For example, call center server 111 may be capable of extracting voice biometric features associated with the callee and forward the voice biometric features to the call analytics system 101.

An agent device 116 of the service provider system 110 may allow agents or other users of the service provider system 110 to configure operations of devices of the service provider system 110. For calls made to the service provider system 110, the agent device 116 may receive some or all of the call data (or user data) associated with calls from a call center server 111 or call center database 112. The agent device 116 may likewise store call data into a call center database 112 and/or display the call data to the agent via a GUI. In some implementations, the agent device 116 may be used to label call data (or user data) as being associated with fraudulent calls or non-fraudulent calls, and store such labeled call data (or user data) into a call center database 112 or forward the labeled call data (or user data) to the call analytics system 101.

A call center database 112 of the service provider system 110 may store call data (or user data) received from a call center server 111 or agent device 116. The call center database 112 may likewise transmit call data to the call center server 111, agent device 116, or call analytics system 101 in response to instructions or queries, or pre-configured triggering conditions (e.g., receiving new call data).

The caller device 114 may be any communications or computing device the caller operates to place the telephone call to the call destination (e.g., the service provider system 110). Non-limiting examples of caller devices 114 may include landline phones 114*a* and mobile phones 114*b*. The caller device 114 is not limited to telecommunications-oriented devices (e.g., telephones). As an example, the calling device 114 may include an electronic device comprising a processor and/or software, such as a computing device 114*c* or Internet of Things (IoT) device, configured to implement voice-over-IP (VoIP) telecommunications. As another example, the caller device 114*c* may be an electronic IoT device (e.g., voice assistant device, "smart device") comprising a processor and/or software capable of utilizing telecommunications features of a paired or otherwise networked device, such as a mobile phone 114*b*. A caller device 114 may comprise hardware (e.g., microphone) and/or software (e.g., codec) for detecting and converting sound (e.g., caller's spoken utterance, ambient noise) into electrical audio signals. The caller device 114 then transmits the audio signal according to one or more telephony or other communications protocols to a callee for an established telephone call.

Generally, when the caller places the telephone call to the service provider system 110, the caller device 114 instructs components of a telecommunication carrier system or network to originate and connect the current telephone call to the service provider system 110. The various components (e.g., switches, trunks, exchanges) of the telecommunications networks and carriers, and in some cases the caller device 114, may generate various forms of call data, which can be stored in a records database 104, and in some cases into a telephony database 108. When the inbound telephone call is established between the caller device 114 and the service provider system 110, a computing device of the service provider system 110, such as a call center server 111 or agent device 116 forwards call data (and user data received during the ongoing telephone call) to the call analytics system 101 via one or more computing networks.

The call data and user data for the current, inbound telephone call may be received at a device of the call analytics system 101 (e.g., analytics server 102) and stored into an analytics database 106. The call data may contain inferred identity information based on the communication channel (e.g., telecommunications carrier network). The user data may contain identity claim information based on user inputs. The analytics server 102 may query databases 104, 106, and/or 108 to determine additional inferred identity data and identity claim associated with the incoming call. Additionally or alternatively, a computing device of the service provider system 110, such as a call center server 111 or agent device 116 may query databases 104, 106, and/or 108 for additional inferred identity and identity claim data before forwarding the inferred identity data associated with the incoming call to the analytics server 102.

The analytics server 102 receives call data and user data from the records database 104 in the call analytics system 101, and also receives or generates various data structures (e.g., threshold values, feature vectors, trained machine-learning models) used for executing anti-fraud processes. The analytics server 102 may also query or otherwise receive certain types of data from a telephony database 108, which may be operated by a third-party service and may contain data associated with, for example, caller devices 114, carriers, callers, and other types of information. The user data and call data received by the analytics server 102 may be associated with an ongoing interaction (e.g., an inbound call) or a historic interaction (e.g., the user data, call data, features, inferred identity data, and/or identity claim data may be determined at a prior time).

The analytics server 102 of the call analytics system 101 may generate (identify, build, map, and partition portions) a data structure representing a graph, or graph structure, using call data (e.g., channel related inferred identity information) and user data (e.g., identity claim information claimed by users). The analytics server may use the inferred identity information and associated identity claim information (e.g., II-IC pairs) of past and/or current inbound calls in generating the graph. The analytics server 102 may receive the inferred identity information and associated identity claim information from for example, the service provider system 110, third-party service provider system 107, and/or other telecommunications systems.

In some configurations, the analytics server 102 may generate a graph of the interactions associated with all of the call data and all of the user data (e.g., the total historic interactions). The analytics server 102 may use the all of the historic interactions stored in databases such as the call record database 104, analytics database 106, call center database 112 and/or telephony database 108. The analytics server 102 associates (e.g., maps, links) the call data and associated user data using historic interactions involving all of the historic call data and user data. The analytics server 102 uses the mapped call data and user data to create a data structure modeling the pairwise relationship between the call data and user data. Additionally or alternatively, the analytics server 102 may use a portion of all of the historic interactions stored in the databases. For example, the analytics server 102 may generate the graph using all of the call data, user data, and associated interactions for a certain number of years. For instance, all of the call data and user data in the last five years may be mapped according to their respective interactions. The analytics server 102 may store the graph in databases such as the call record database 104 or analytics database 106.

Additionally or alternatively, the analytics server 102 may generate (or build) the graph of the interactions associated with all of the call data and all of the user data (or a portion of all of the historic interactions associated with all of the call data and all of the user data) each interaction (e.g., each time the analytics server 102 receives new call data and/or user data). Additionally or alternatively, the analytics server 102 may not generate a graph of the interactions associated with all of the call data and all of the user data and instead, as described below, generate a sub-graph of the relationship of the call data and user data, and the call data, user data, and interactions associated with the call data and user data associated with the current interaction (e.g., an incoming call, a predicted incoming call, and the like).

Each interaction, the analytics server 102 may supplement (append, build, link, update, and the like) the stored graph with call data and user data associated with current interaction. The analytics server 102 may identify (or extract) a portion of the graph to create a sub-graph associated with the current interaction, where the sub-graph represents the relationship of the call data, user data, and call data and/or user data associated with call data and user data associated with the current interaction (e.g., an incoming call, a predicted incoming call, and the like). The analytics server 102 may derive features from the sub-graph, graph, and/or stored call data and user data.

Additionally or alternatively, the analytics server 102 may generate a sub-graph each interaction associated with the current interaction. The analytics server 102 may derive features from the sub-graph and stored call data and user data. For example, the analytics server 102 may query databases such as the call record database 104, analytics database 106, call center database 112 and/or telephony database 108 and determine interactions associated with all of the call data and all of the user data (the total historic interactions) or a portion of the total historic interactions, and use the total historic interaction data in deriving features associated with the sub-graph.

The analytics server 102 may use the derived features to generate a risk score for a current inbound call, and in turn determine whether the risk score satisfies a threshold value, which may be a threat risk threshold.

The analytics server 102 may be any computing device comprising one or more processors and software, and capable of performing the various processes and tasks described herein. The analytics server 102 may host or be in communication with databases 104, 106, 108, and may receive call data and user data from one or more service provider system 110, and a third-party service provider system 107. Although FIG. 1 shows a single analytics server 102, the analytics server 102 may include any number of computing devices. In some configurations, the analytics server 102 may comprise any number of computing devices operating in a cloud computing or virtual machine configuration. In some configurations, functions of the analytics server 102 may be partly or entirely performed by computing devices of a service provider system 110 (e.g., call center server 111).

In operation, the analytics server 102 may execute various software-based processes that, for example, ingest call data of telephone calls, ingest user data received from telephone calls, query one or more databases 104, 106, 108, generate a graph based on call data and user data of prior calls stored in the analytics database 106 and/or call records database 104, and determine a risk score of a current inbound call to a service provider system 110 using features derived from the graph.

In particular, the analytics server 102 extracts features from the graph using local structure based similarity methods and/or generating an adjacency matrix indicating the relationships of the nodes and edges in the graph. The analytics server 102 executes machine learning (such as neural networks, support vector machines, random forests, linear regression, clustering, gradient boosting algorithms, and the like) in real-time on the features derived from the graph to predict a risk score indicative of the probability of fraud associated with the ongoing call forwarded from the service provider system 110 or received directly from the calling device 114.

In some configurations, the risk score represents whether the call is risky (e.g., the probability of a fraudulent call based on the call data such as inferred identity information and user data such as identity claim information). In some configurations, the risk score represents whether the identity claim is risky (e.g., the probability of an imposter based on historic identity claim information). The risk score may indicate the likelihood that call is risky or that the user may not be who the user claims to be. For instance, the risk score may, for example, indicate whether the II-IC pair are expected to be found together using the call data and user data. The analytics server 102 may also determine whether the risk score satisfies a threshold value, which may be a threat risk threshold.

The output of the machine learning model can be a probability between 0 and 1. The probability indicates the likelihood that the interaction associated with the II-IC pair is involved in fraudulent activity (or the likelihood of the identity claim being involved in a fraudulent activity). The analytics server 102 may apply a threshold to the output probability to transform the output into a fraud/non-fraud binary indicator. Additionally or alternatively, the output of the machine learning model may be trained to output a fraud/non-fraud binary indicator.

The analytics server 102 trains the machine learning model via supervised learning to classify a new interaction as a fraudulent interaction or a genuine interaction using training call data and user data (e.g., II-IC pairs) from previously received calls. The training II-IC pairs, with their associated features, can be stored in one or more corpora that the analytics server 102 references during training. For each training II-IC pair and associated set of features received by the analytics server 102 from each corpus, there are associated labels indicating whether the II-IC pair is fraudulent or genuine. Calls may be labeled as fraudulent by admin users of the call analytics system 101 or agent users of service provider system 110 using graphical user interfaces (GUIs) of client computing devices (e.g., admin device 103, agent device 116).

Additionally or alternatively, labels associated with the II-IC pair may consist of an indicator that the identity claim data has recently been involved in fraudulent activity. That is, the analytics server 102 assesses prior interaction history of the identity claim regardless of the current interaction. The label may be generated using, for example, an admin device 103 such that an administrative user can execute known fraud methods (e.g., spoofing software services, ANI-masking software services) to simulate fraudulent calls targeting the service provider system 110 and related metadata, and generate labeled fraud call data. The analytics server 102 references the labels to determine a level of error during training.

The analytics server 102 trains the machine learning model (such as a random forest model) based on inputs (e.g., training II-IC pairs), predicted outputs (e.g., calculated risk score), and expected outputs (e.g., labels associated with the training II-IC pairs). The training II-IC pairs are fed to the machine learning model, which the machine learning model uses to generate a predicted output (e.g., predicted risk score) by applying the current state of the machine learning model on the training II-IC pairs. The analytics server 102 references and compares the label associated with the training II-IC pairs (e.g., expected risk score, which may be a risk classification such as fraudulent callee or not fraudulent callee) against the predicted risk scores generated by the current state of the machine learning model to determine the amount of error or differences. The analytics server 102 tunes weighting coefficients of the machine learning model to reduce the amount of error, thereby minimizing the differences between (or otherwise converging) the predicted output and the expected output.

The analytics server 102 tunes the weights in the machine learning model until the error is small enough such that the error is within a predetermined acceptable margin of error. Additionally or alternatively, the analytics server 102 adjusts the weights based upon a predetermined number of training iterations and/or batches. After training the machine learning model, the analytics server 102 stores the trained machine learning model in the analytics database 106 for instance. The analytics server 102 will employ the trained machine learning model to evaluate the riskiness of an incoming interaction.

An admin device 103 of the call analytics system 101 is a computing device allowing personnel of the call analytics system 101 to perform various administrative tasks or user-executed call analytics operations. The admin device 103 may be any computing device comprising a processor and software, and capable of performing the various tasks and processes described herein. Non-limiting examples of an admin device 103 may include a server, personal computer, laptop computer, tablet computer, or the like. In operation, the admin device 103 is employed by a user to configure operations of various components in the system 100, such as an analytics server 102 and may further allow users to issue queries and instructions to various components of the system 100. For example, the admin device 103 may be used to label call data as being associated with fraudulent calls or non-fraudulent calls, and store such labeled call data into a call record database 104 or analytics database 106.

The admin device 103 may also be used to input a threshold (e.g., threat risk threshold) to the analytics server 102 or an analytics database 106 for determining risk scores. In some cases, the threshold values may be global for all calling devices 114 to all service provider systems 110. In some cases, the admin device 103 may use tailored threshold values for a particular service provider system 110.

A call records database 104 of the call analytics system 101 may receive and store call data, as received by the call analytics system 101 from various sources, which may include service provider systems 110 and, in some cases, a telecommunications carrier or network device. The call records database 104 may be hosted on any computing device comprising one or more processors and software, and capable of performing the various processes and tasks described herein. As shown in FIG. 1, the call records database 104 may be hosted on a single computing device, but the call records database 104 may be hosted on any number of computing devices.

In operation, the call records database 104 may store call data (e.g., inferred identity data) and user data (e.g., identity claim data) for prior calls and current calls. The call records database 104 can be queried by the analytics server 102 or other devices of the system 100 when performing various tasks, such as generating a graph, extracting features of the graph, determining a risk score, or other operations requiring information about calling devices 114. Generally, when a caller places a telephone call to a service provider system 110, a caller device 114 instructs components of a telecommunication carrier system or network to originate and connect the current telephone call to the service provider system 110. A telecommunications carrier associated with the caller device 114, and in some cases the caller device 114 itself, generates various forms of call data (e.g., inferred identity data) that the analytics server 102 uses when calculating fraud risk scores, generates a graph, or extracts features from the graph. The call data may be received by computing devices of the service provider system 110 and forwarded to the call analytics system 101, where data (including the inferred identity data, identity claim data, features) is stored into the record database 104 or other database (e.g., analytics database 106).

The analytics database 106 may store risk thresholds and trained machine learning models used in determining the risk score for particular service provider systems 110. The analytics database 106 (and call center database 112) may also contain any number of corpora that are accessible to the analytics server 102 via one or more networks. The analytics server 102 may access a variety of corpora to retrieve training II-IC pairs. The analytics database 106 (and call center database 112) may also query the telephony database 108 to access inferred identity and/or identity claim information.

The analytics database 106 may be hosted on any computing device comprising one or more processors and software, and capable of performing various processes and tasks described herein. As shown in FIG. 1, the analytics database 106 is hosted on a single computing device, but the analytics database 106 may be hosted on any number of computing devices.

When determining a risk score for an incoming call is received at a service provider system 110, the analytics server 102 may retrieve trained machine learning models according to the service provider system 110 and historic call data and user data associated with the call data and user data received at the service provider system 110. The analytics server 102 then executes processes for determining the risk score for the call using features extracted from a graph generated from the user data and call data.

Figure 2:
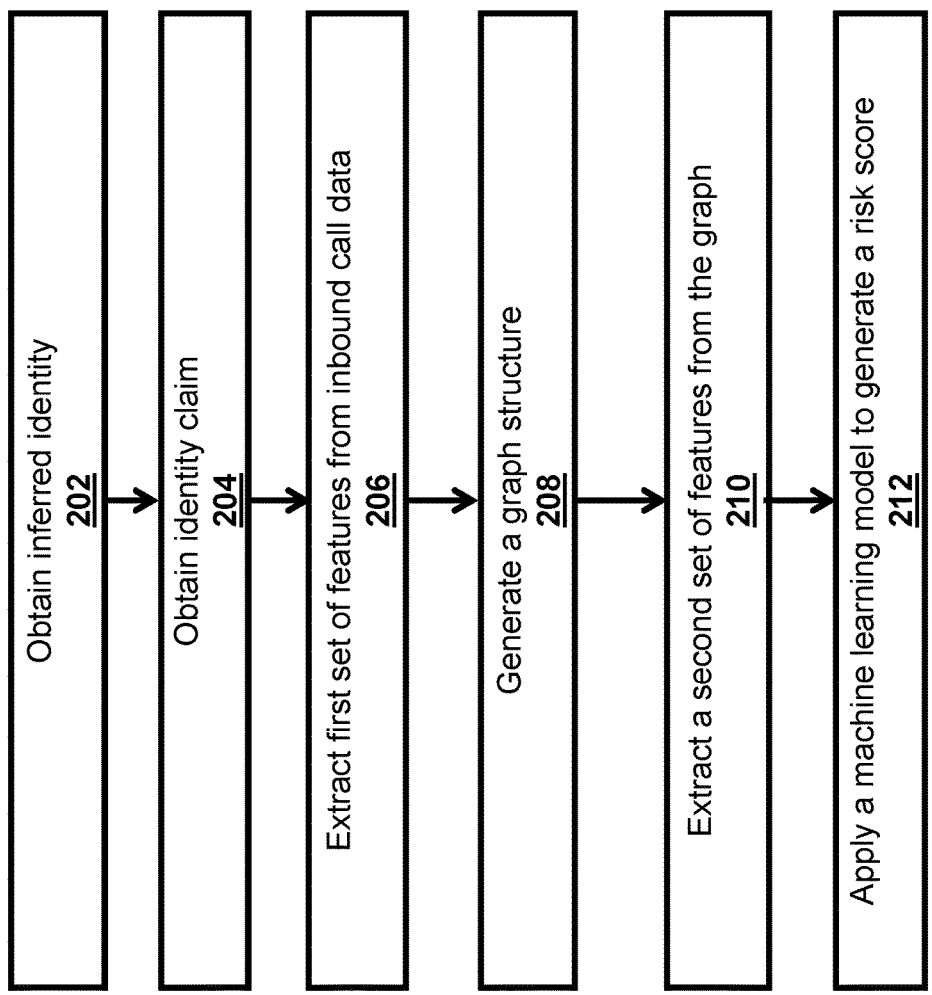
FIG. 2 shows execution steps of a method for determining a risk score of an interaction using graph-derived features, according to an embodiment.

FIG. 2 shows execution steps of a method 200 for determining a risk score of associated with an interaction using graph-derived features, according to an embodiment. The method 200 is described below as being performed by a server executing machine-readable software code. Some embodiments may include additional, fewer, or different operations than those described in the method 200 and shown in FIG. 2. The various operations of the method 200 may be performed by one or more processors executing of any number of computing devices.

In step 202, the server may obtain an inferred identity from inbound call data. The inbound call data may be data associated with a call and a caller, and is forwarded from a provider server (e.g., call center server 111 in FIG. 1) to the server.

As discussed herein, the inferred identity is the information that is associated with a protocol of a particular communication channel and therefore is dependent on the interaction and associated communication channel. For example, an inferred identity in a telephony communication channel may be an ANI, a device ID, the IMEI, originating switch, originating trunk, JIP, OLI, a P-Asserted-Identity value, and Caller ID, and the like. An inferred identity in an internet networking channel may be an IP address, cookies, MAC addresses, and the like.

In step 204, the server may obtain an identity claim associated with the inbound caller. As discussed herein, the identity claim is the information that a user uses to claim and/or assume an identity associated with the user's action. For example, the user may provide an input during the call such as an account identifier, a social security number, a personal identifier, a credit card/debit card number, and the like. The manner of providing the account identifier may vary depending on the channel (e.g., spoken, typed, dual-tone multi-frequency (DTMF) tones, written down by an agent).

In step 206, the server may extract a first set of features from the inbound call data. The server may annotate inferred identity and/or identity claim data with the first set of features. For example, metadata associated with the identity claim may include an invalid identity claim feature. The invalid identity claim feature may be a Boolean feature that indicates whether the identity claim is invalid. The definition of an invalid identity claim may be specific to the account associated with the identity claim. For example, the server may determine a SSN associated with an identity claim of 00-000-0000 or 99-999-9999 to be invalid. Additional metadata associated with the identity claim may include identity claim switch. The identity claim feature switch may measure the number of times an inferred identity has chronically switched calls to identity claim. For example, if there are events from the same inferred identity to multiple identity claims with the sequence "A,B,A,A", then the server may determine that the identity claim switch value is two because the inferred identity switched identity claims twice (e.g., from A to B, and from B to A).

The first set of features may also include inferred identity metadata features determined from the communication channel. inferred identity metadata features may include a country, a region, a city, a longitude and latitude, a time zone associated with the user, a connection speed, an internet service provider (ISP), or voice biometric features extracted from voice samples received by the server.

In step 208, the server may generate a graph associated with the inbound call data (e.g., the II-IC pair associated with the inbound call and additional II-IC pairs associated with the inbound call). The nodes of the graph are inferred identity and identity claim data associated with the II-IC pair associated with the inbound call data. The edges of the graph represent a structural relationship between the nodes of the graph.

The server may query a database for the inferred identity associated with the inbound call to get all of the historic identity claim information (an identity claim and associated inferred identity, call data, and features associated with a prior call) related to the inferred identity associated with the inbound call. Similarly, the server may query a database for the identity claim associated with the inbound call to get all of the historic inferred identity information (an inferred identity and associated identity claim, call data, and features associated with a prior call) related to the identity claim associated with the inbound call. The server identifies the structure of the graph and not merely first degree connections of the inferred identity and the identity claim. In generating the graph, the server may exclude the direct connections (e.g., the connections between the inferred identity and the inferred identity, the identity claim and the identity claim). In addition, the server may query a database for the complements of the II-IC pair.

For example, a user interacting with the provider over the phone may be associated with ANI 1. The account that the user is accessing may be based on Identity claim 1. The server may query one or more databases (e.g., provider database such as call center database 112 and/or records database 104 in FIG. 1) for historic information associated with ANI 1 and Identity claim 1. As discussed herein, ANI 1 and Identity claim 1 (inferred identity and identity claim information respectively) will be nodes of the graph, and the ongoing user interaction may be the edge connecting the nodes.

In the event the inferred identity is a gateway ANI, the server may not generate the graph using all of the connections associated with the gateway ANI. A gateway is defined as an ANI that is allocated for use by more than one person and more than one device. By definition, the gateway ANI may be associated with numerous identity claims. An example gateway ANI is 1-559-515-8002, which is a Skype® gateway, commonly used as the caller's phone number when a call is made to a phone using Skype®. However, a landline telephone that is used by multiple people to make calls would not be considered a gateway, because it is a single device. Because the gateway ANI is associated with numerous identity claims, the server may restrict the number of identity claims associated with the ANI. The number may be dynamically determined by the server or manually determined by users/administrators in the service provider system. That is, instead of connecting all 200 example identity claims associated with the gateway ANI in the graph, the server may generating a graph connecting ten identity claims associated with the gateway ANI.

The generated graph is a sub-graph (or an isolated graph) contained (or embedded) in a larger graph structure, the larger graph structure connecting all of the interactions and all of the inferred identities and identity claims associated with a provider. The larger graph structure may be represented using call records in one or more databases such that the larger graph structure is not connected and stored in memory of the provider server (for computing efficiency purposes). Additionally or alternatively, the larger graph structure may be stored in memory of the provider server or other database and updated each time the provider server receives inbound call data (or new interaction data). The sub-graph, indicating the structure of the inferred identities and identity claims involved in the interactions, is generated and/or identified for each interaction (or communication event) between the end user and the provider.

In step 210, the server may extract a second set of features from the graph (or sub-graph) based on the topology of the nodes and edges. The server may also extract features using the sub-graph and larger graph structures. For example, the server may extract behavior features. The server may determine an inferred identity fraud ratio. The inferred identity fraud ratio may indicate the ratio of fraud events to all identity claims (determined from the larger graph) from the inferred identity. The server may also determine an inferred identity weighted fraud ratio, where the server adds different weights for each identity claim. The server may also determine a graph fraud ratio indicating the ratio of the total number of fraud events (or edges) in the larger graph to the number of events (or edges) in the graph (or sub-graph of the larger graph). The server may also determine a behavior feature indicating whether fraud is present. The fraud present feature may be a Boolean feature that indicates whether there are prior fraudulent events between inferred identity and identity claim in the graph (excluding the inferred identity and identity claim associated with the current interaction because the server may not have information as to whether the current interaction is fraudulent or not). The server may also determine an identity claim fraud ratio which is the ratio of fraudulent events to all inferred identities in the larger graph made with the identity claim.

In the context of telecommunication systems, the server may also determine an ANI ratio. The ANI ratio may indicate the ratio of calls in the graph having the same ANI-prefix/area code as the ANI in the interaction. In some of the features, the server may use the number of unique ANIs. In other features, the server may use the number of calls associated with that ANI. The server may also determine a carrier ratio indicating the ratio of calls within the graph (or sub-graph) having the same carrier as the carrier determined from the inferred identity in the interaction (e.g., determined from the first set of features of the inbound call in step 208).

The server may also extract features directly from the graph including, but not limited to, the degree of inferred identity, the degree of identity claim, and a Boolean representation of historic II-IC edges. The server may also extract features that evaluates (or indicates) the similarity of nodes in the graph using local structure similarity based index methods including, but not limited to Jaccard Index, Salton Index, Sorensen Index, Adamic Adar Index, Resource Allocation Index, Hub Promoted Index, Hub Depressed Index, Leich Holme Newman Index, Car Based Index, Local Affinity Structure Index, and Preferential Attachment. In determining the features of the graph, the server may generate an adjacency matrix and determine the cosine angle between the rows of the adjacency matrix having the II-IC pairs of interest.

The server may use a modified definition of common neighbors in determining the similarity indices when a bipartite graph is generated (e.g., inferred identity is only connected to identity claim). This is because applying local similarity based indices to bipartite graphs will result in a value of zero. That is, local similarity features are not defined for bipartite graphs. Accordingly, because the server traverses the graph extracting features based on II-IC relationships, the server will analyze the intersection between the neighbors of inferred identity and the neighbors of neighbors for identity claim, excluding identity claim (and the reverse, e.g., the neighbors of identity claim and the neighbors of neighbors of inferred identity). For similarity scores that do not consider common neighbors (e.g., Preferential Attachment), the server may use the standard common neighbor definition. Further, in the event the graph contains inferred identity or identity claim only, the server may use the standard common neighbor definition.

Figure 3:
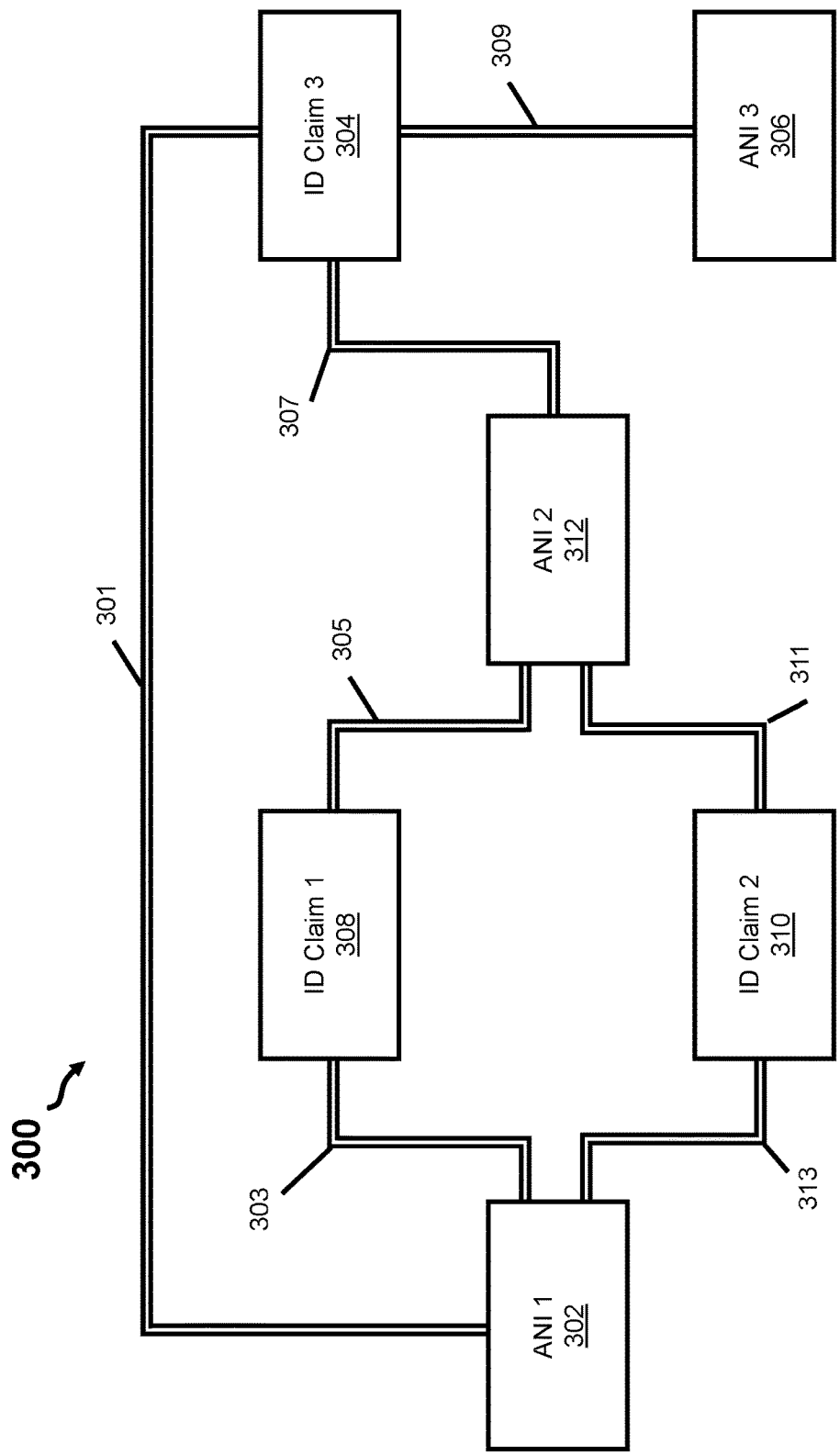
FIG. 3 illustrates a graph generated from II-IC pairs, according to an embodiment.

FIG. 3 illustrates a graph 300 generated from II-IC pairs, according to an embodiment. A user may call a call center from ANI 1 302 and claim ID claim 3 304. The server may query one or more databases (e.g., provider database such as call center database 112 and/or records database 104 in FIG. 1) to retrieve ID Claims associated with ANI 1 302 and ANIs associated with ID claim 3 304. The server may build graph 300 with ANI 1 302 connected to ID claim 3 304 via edge 301 (e.g., the current phone call). The server may also include in graph 300 ANI 3 306 associated with ID claim 3 304 (and the previous interaction relating ANI 3 306 to ID claim 3 304, resulting in the edge connection edge 309), and ID claim 3 304 with ANI 2 312 connected via edge 307. The server includes in graph 300 ID claim 1 308 associated with ANI 1 302 (and the previous interaction relating ID claim 1 308 to ANI 1 302, resulting in the edge connection edge 303), and ID claim 2 310 associated with ANI 1 302 connected via edge 313.

The server may complete the graph by querying one or more databases for ANI 2 312 (because ANI 2 312 was associated with ID claim 3 304 and also ID claim 1 308 and ID claim 2 310). Based on previous call histories, the server will connect ANI 2 312 to ID claim 1 308 via edge 305 and ANI 2 312 to ID claim 2 310 via edge 311.

The server will traverse the graph, deriving features from the graph to be ingested by a machine learning model. As discussed herein, the server will use the modified common neighbor definition by analyzing the intersection between the neighbors of inferred identity and the neighbors of neighbors for identity claim, excluding identity claim (and the reverse, e.g., the neighbors of identity claim and the neighbors of neighbors of inferred identity).

For example, the neighbors of ANI 1 302 are: ID claim 1 308, ID claim 2 310 and ID claim 3 304. The neighbors of neighbors of ID claim 3 304 includes the neighbors of ID claim 3 304 (ANI 1 302, ANI 2 312, and ANI 3 306), the neighbors of ANI 2 312 (ID claim 1 308, ID claim 2 310, and ID claim 3 304), and the neighbors of ANI 3 (Id claim 3 304). The neighbors of ANI 1 302 are not considered because ANI 1 302 is part of the II-IC pair. The intersection between both groups are ID claim 1 308, ID claim 2 310, and ID claim 3 304. Removing ID claim 3 304 because it is part of the II-IC pair, the intersection is I ID claim 1 308 and ID claim 2 310.

Further, the neighbors of ID claim 3 are ANI 1 302, ANI 2 312 and ANI 3 306. The neighbors of neighbors of ANI 1 302 includes the neighbors of ANI 1 302 (ID claim 1 308, ID claim 2 310 and ID claim 3 304), the neighbors of ID claim 1 (ANI 1 302 and ANI 2 312), and the neighbors of ID claim 2 310 (ANI 1 302 and ANI 2 312). The neighbors of ID claim 3 304 are not considered because ID claim 3 304 is part of the II-IC pair. The intersection between both groups are ANI 1 302 and ANI 2 312.

The server may use the intersections of the modified common neighbor analysis in various local structure similarity based index methods. Additionally or alternatively, the server may use a similar modified common neighbor analysis to determine the union of neighbors (as opposed to the intersection of neighbors).

Referring back to FIG. 2, in step 212, the server may apply a machine learning model to the graph-derived features to generate a risk score. The risk score may be based upon a prediction that the interaction associated with the inbound call is fraudulent. A risk score being closer to 1 may indicate a high probability of a fraudulent interaction, while a risk score being closer to 0 may indicate a low probability of a fraudulent interaction. The machine learning model may be configured and trained to receive feature vector(s) from the first set of features and the second set of features and output the risk score. The machine learning model may be a random forest, neural network, support vector machine, linear regression algorithms, gradient boosting algorithms, and the like.

In some configurations, the server may classify the interaction using the risk score and one or more thresholds. The thresholds may be determined dynamically or manually (e.g., via administrative users at the provider server).

Figure 4:
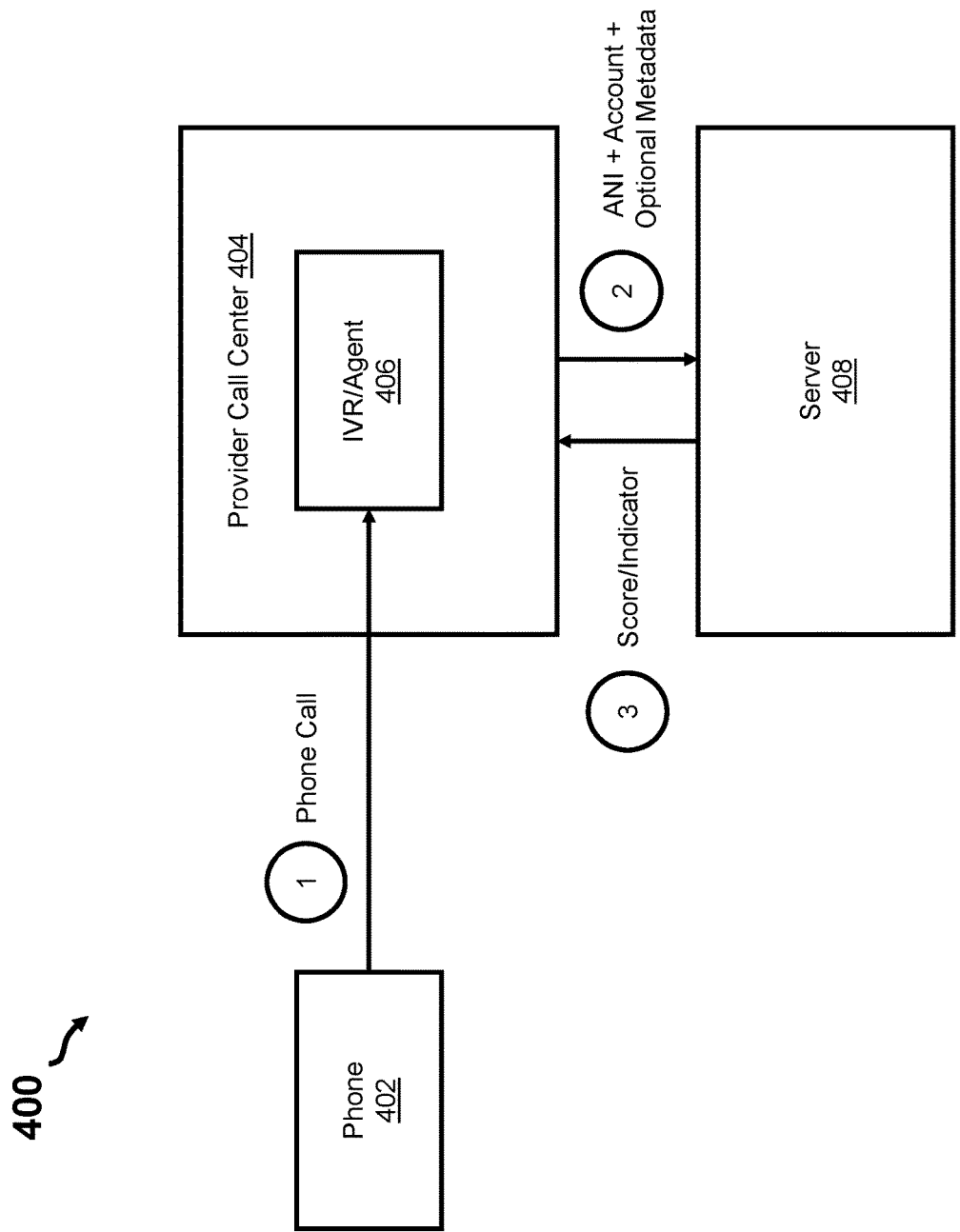
FIG. 4 illustrates a system in which the server assigns a fraud risk score to an incoming call in a call center, according to an embodiment.
Figure 5:
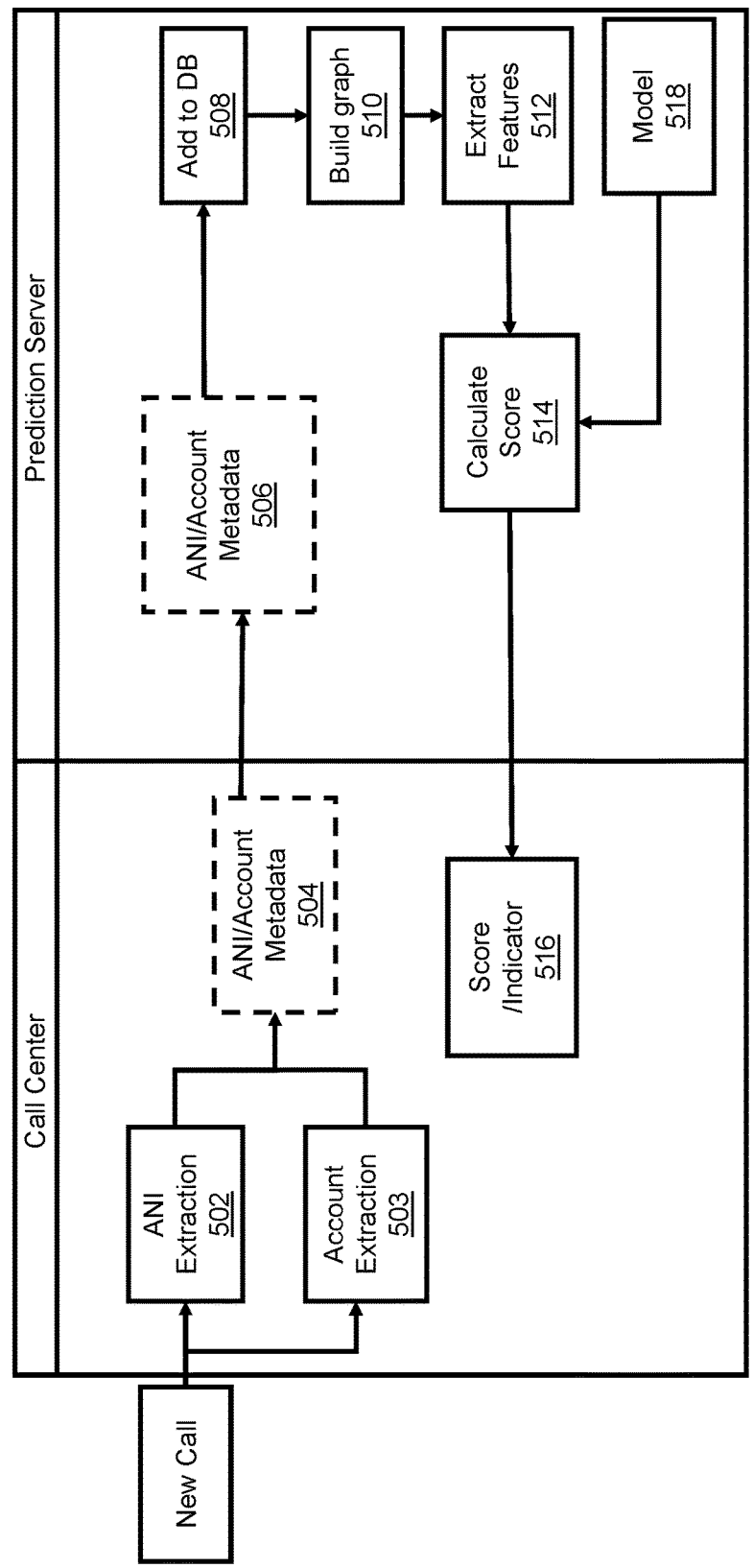
FIG. 5 illustrates a flowchart of the steps performed in a system in which the server assigns a fraud risk score to an incoming call in a call center, according to an embodiment.

The extraction of inferred identity features may be dependent on the interaction and the provider institution. FIG. 4 illustrates a system 400 in which the server assigns a fraud risk score to an incoming call in a call center, according to an embodiment. FIG. 5 illustrates a flowchart 500 of the steps performed in a system in which the server assigns a fraud risk score to an incoming call in a call center, according to an embodiment. When a user uses a phone 402 to call a provider call center 404, the user may interact with an IVR and/or an agent 406. When the user uses the phone 402 to call the provider call center 404, the provider call center may determine the ANI (e.g., step 502 in FIG. 5) associated with the incoming call. For example, the call center 404 may extract the ANI from the call channel. Upon interacting with the IVR and/or agent 406, the provider call center 404 may extract an account number (e.g., step 503 in FIG. 5). The call center 404 may extract the account number (e.g., claimed account information associated with the caller) using a lookup table and the extracted ANI, from DTMF tones or using speech recognition (e.g., the user speaks the account number and the provider call center 404 performs speech recognition to recognize the account number from the speech), or an agent on the line may receive and input the account number. The received account number associated with the ANI creates an II-IC pair, or an ANI-Account number pair.

In some configurations, the provider call center 404 may query a database to determine if there is additional ANI and/or account number metadata (e.g., step 504 in FIG. 5) associated with the ANI-Account number pair. The database may be a database located in the provider call center 404 or a third party database.

The ANI-Account number pair (and any additional metadata) is forwarded to the server 408. The server 408 may extract other metadata from the ANI-Account number pair (e.g., step 506 in FIG. 5). For example, the server 408 may extract metadata including the prefix, country, state, call type (e.g., landline, VoIP, cellular), ANI ratio, carrier ratio, and area from the ANI. The server 408 stores the extracted metadata in a database (e.g., extracted metadata in step 506 in FIG. 5 is stored in database in step 508 in FIG. 5). The server 408 will build a sub-graph (e.g., step 510 in FIG. 5) using the ANI, Account number, ANI metadata, Account number metadata, and timestamp information (e.g., the current timestamp, the timestamp associated with the incoming call, etc.). The server 408 will extract features from the sub-graph (e.g., step 512 in FIG. 5). The server 408 will calculate a risk score (e.g., step 514 in FIG. 5) using the extracted features from the sub-graph (e.g., step 512 in FIG. 5) and a trained machine learning model (e.g., step 518 in FIG. 5).

The server 408 will forward the risk score (or convert the risk score into a binary fraud/non-fraud indicator) to the provider call center 404 (e.g., step 516 in FIG. 5). The provider call center 404 may analyze the risk score (or indicator) in real-time or during offline analysis. For example, if the agent or IVR 406 is still connected with the user, then then agent or IVR 406 may present the user additional security questions and/or perform other security related operations.

In some configurations, the operations performed by the provider call center 404 may be executed offline. That is, the provider call center 404 may not be connected with an ongoing call. Instead of extracting II-IC information (e.g., inferred identity, identity claim inferred identity metadata, identity claim metadata, and associated features) from the ANI and Account number associated with a call (e.g., ANI extraction in step 502 and Account extraction in step 503 from the call in FIG. 5), the provider call center 404 may use packet captures, historical calls, or retrieved inferred identity and identity claim data from one or more databases to extract II-IC information.

Figure 6:
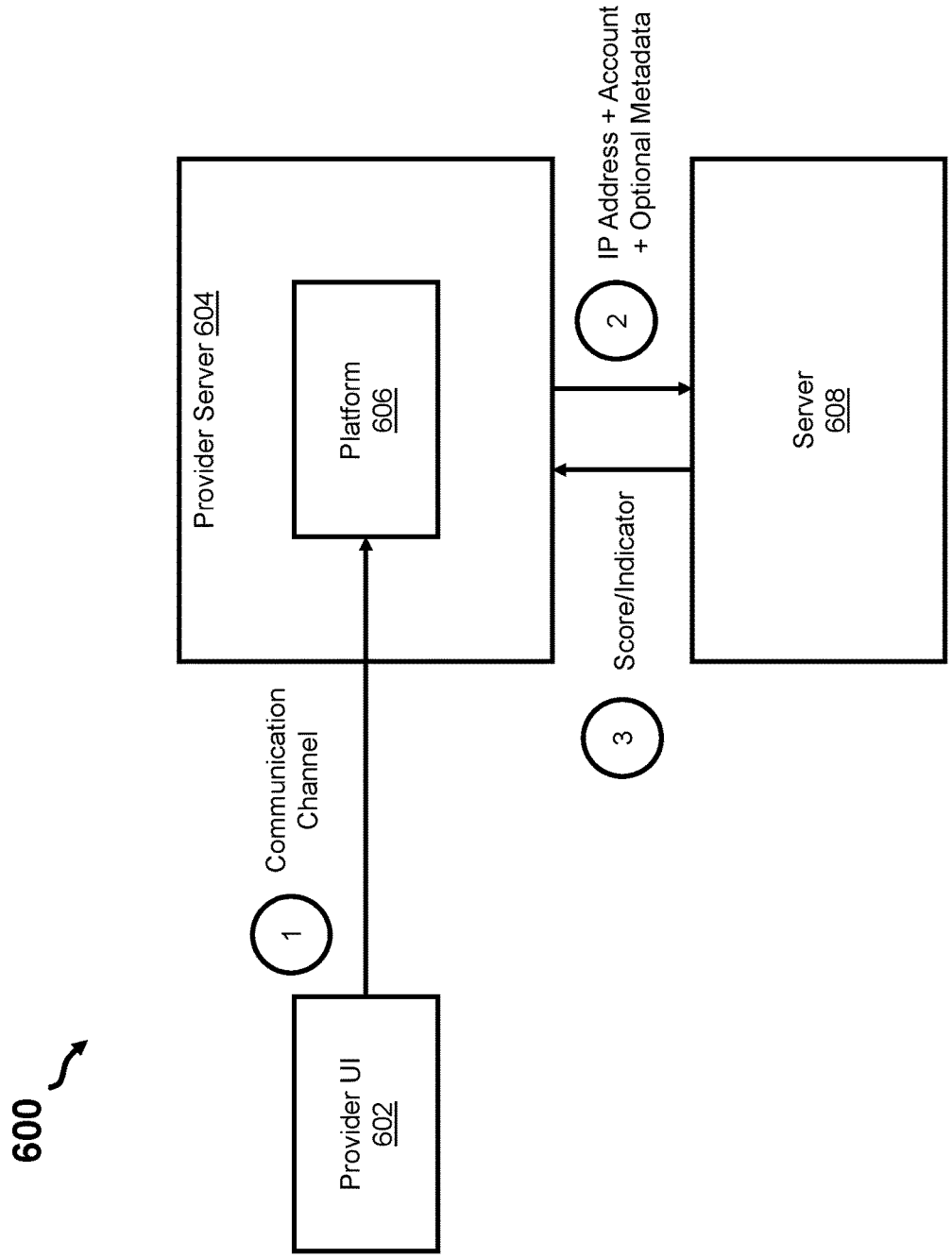
FIG. 6 illustrates a system in which the server assigns a fraud risk score to a transaction associated with a provider, according to an embodiment.
Figure 7:
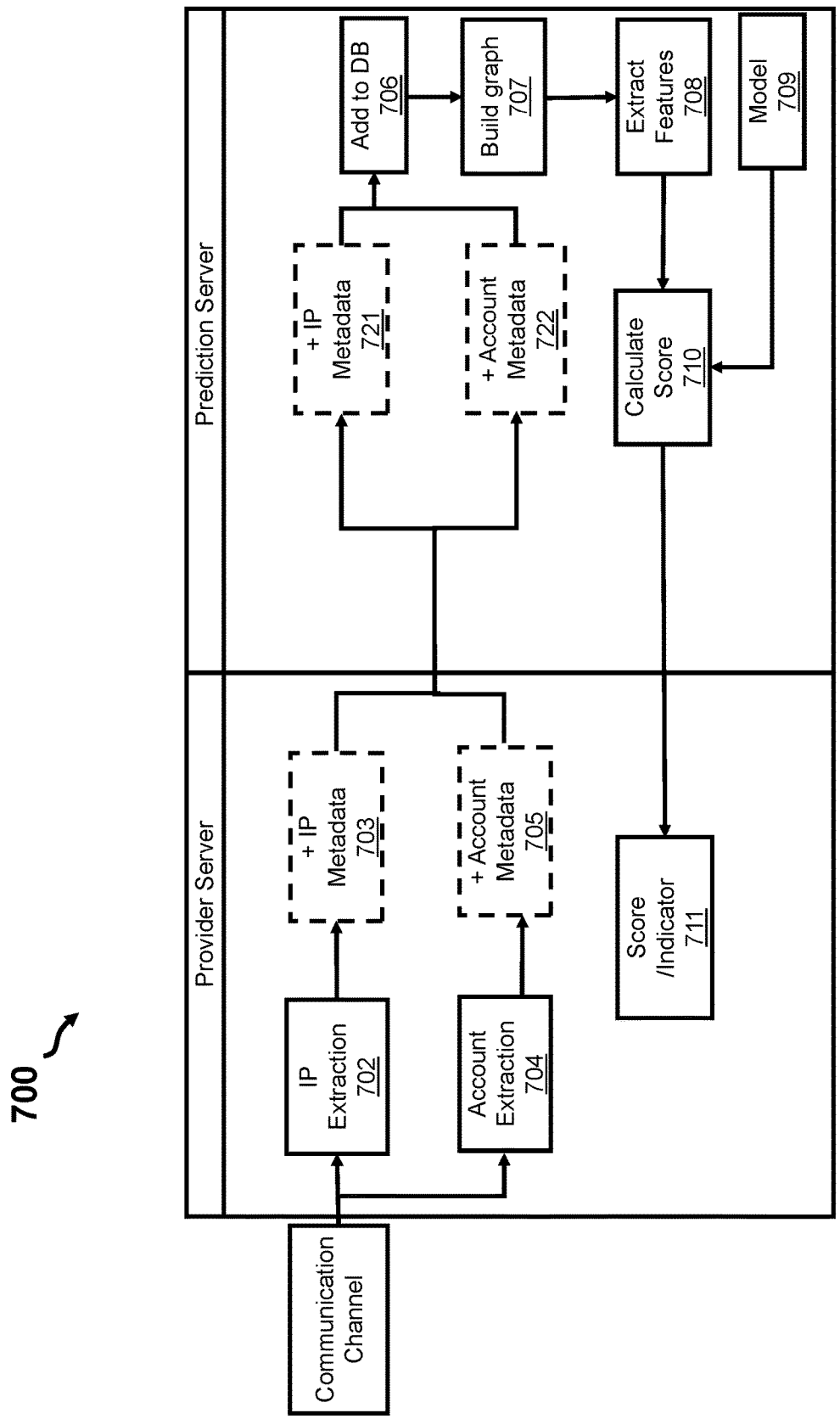
FIG. 7 illustrates a flowchart of the steps performed in system in which the server assigns a fraud risk score to a transaction associated with a provider, according to an embodiment.

FIG. 6 illustrates a system 600 in which the server assigns a fraud risk score to a transaction associated with a provider, according to an embodiment. FIG. 7 illustrates a flowchart 700 of the steps performed in system in which the server assigns a fraud risk score to a transaction associated with a provider, according to an embodiment.

In a commercial context (such as a user purchasing products or otherwise interacting with a retailer), the account associated with the user may be a transaction. For example, a retailer may associate a transaction ID with each transaction that uniquely identifies the transaction history. In a different commercial context (such as a user purchasing insurance or otherwise interacting with an insurance provider), the account associated with the user may be a policy. For example, in the insurance provider context, the policy may be an insurance policy identifiable by the insurance policy number. For instance, a car insurance policy may include the vehicle identification number (VIN) number of the car, the driver's name and address, and the policy coverage. A health insurance policy may include the name of the policy holder, the policy validation date, the policy coverage details, and the like.

The user may interact with the provider (e.g., the service provider system 110 in FIG. 1) using a provider user interface (UI) 602 (such as a website on the internet) to perform a transaction associated with the user's account. The transaction associated with the UI 602 occurs over a communication channel such as internet networking. The communication channel may connect the user's interactions with the provider UI 602 to the provider server 604 and more specifically, to a platform 608 creating the environment in which the provider server 604 software is executed on. The communication channel may facilitate the sending and receiving of packets using the user's IP address. The provider server 604, may extract the IP address and account information (e.g., step 702 and step 704 in FIG. 7) using the content in the packets from the communication channel. The provider server 604 may identify the account information (e.g., claimed account information associated with the user) in the packets using a lookup table associated with the extracted IP address, identifying content input by the user (e.g., the user may have typed account information), or using speech recognition (e.g., the user speaks account information and the provider server 604 performs speech recognition to recognize the account information from the speech). The received account information and associated IP address creates an II-IC pair, or an IP address-Account pair.

In some configurations, the provider server 604 may query a database to determine if there is additional IP address metadata (e.g., step 703 in FIG. 7) and/or account number metadata (e.g., step 705 in FIG. 7) associated with the IP address and account information respectively. The database may be a database located in the provider server 604 or a third party database.

The IP address-Account pair (and any additional metadata) is forwarded to the server 608. The server 608 may extract metadata from the IP address (e.g., step 721 in FIG. 7) and/or extract metadata from the account information (e.g., step 722 in FIG. 7). For example, the server 608 may extract metadata including the country, region, city, latitude and longitude, time zone, connection speed, and internet service provider (ISP). The server 608 stores the extracted metadata in a database (e.g., extracted metadata in step 721 associated with the IP address and metadata in step 722 associated with the account information in FIG. 7 is stored in database in step 706 in FIG. 7). The server 608 will build a sub-graph (e.g., step 707 in FIG. 7) using the IP Address, account information, IP Address metadata, account information metadata, and timestamp information (e.g., the current timestamp, the timestamp associated with the incoming call, etc.). The server 608 will extract features from the sub-graph (e.g., step 708 in FIG. 7). The server 608 will calculate a risk score (e.g., step 711 in FIG. 7) using the extracted features from the sub-graph (e.g., step 708 in FIG. 7) and a trained machine learning model (e.g., step 709 in FIG. 7).

The server 608 will forward the risk score (or convert the risk score into a binary fraud/non-fraud indicator) to the provider server 604 (e.g., step 711 in FIG. 7). The provider call center 604 may analyze the risk score (or indicator) in real-time or during offline analysis.

Figure 8:
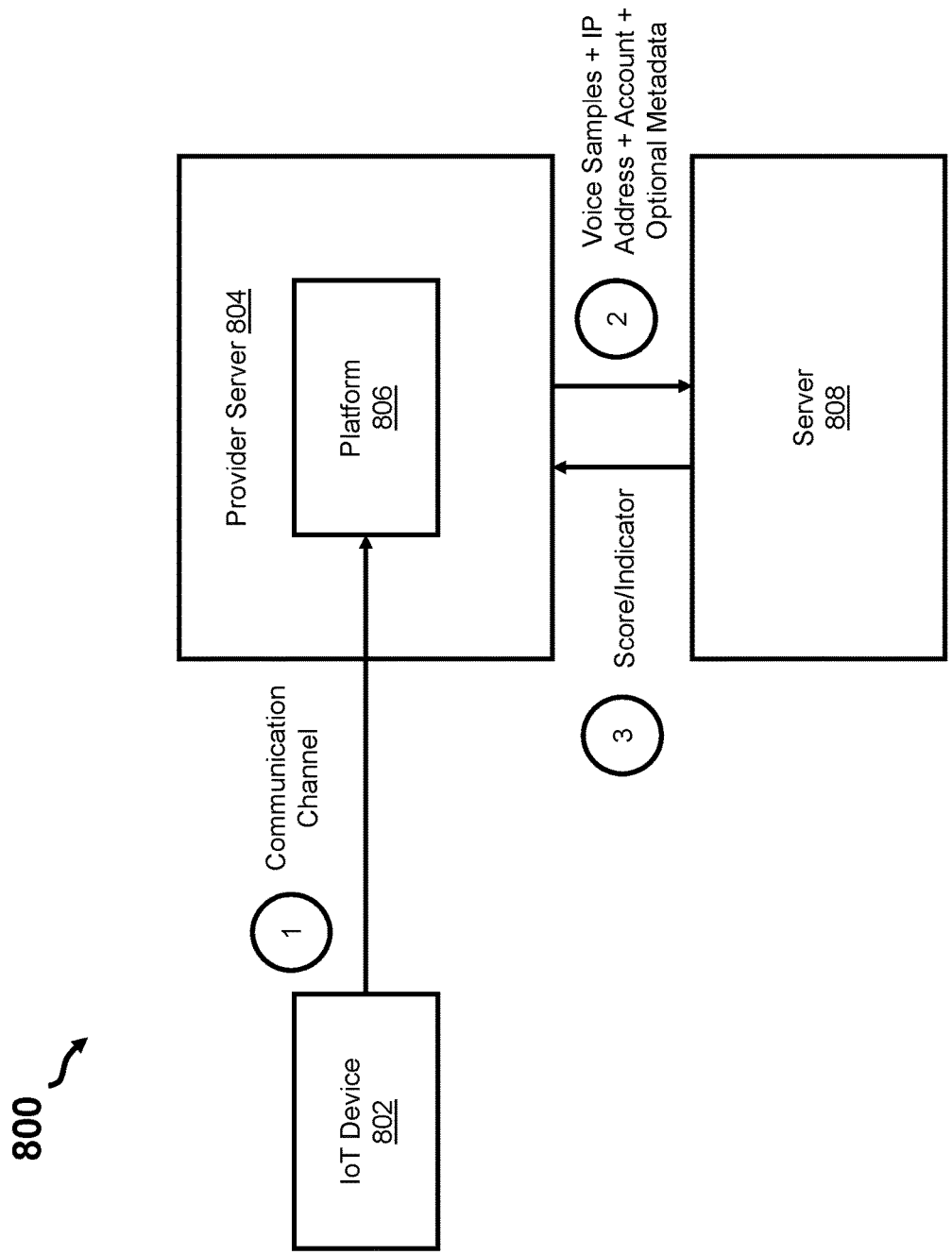
FIG. 8 illustrates a system in which the server assigns a fraud risk score to a transaction associated with a provider using an IoT device, according to an embodiment.
Figure 9:
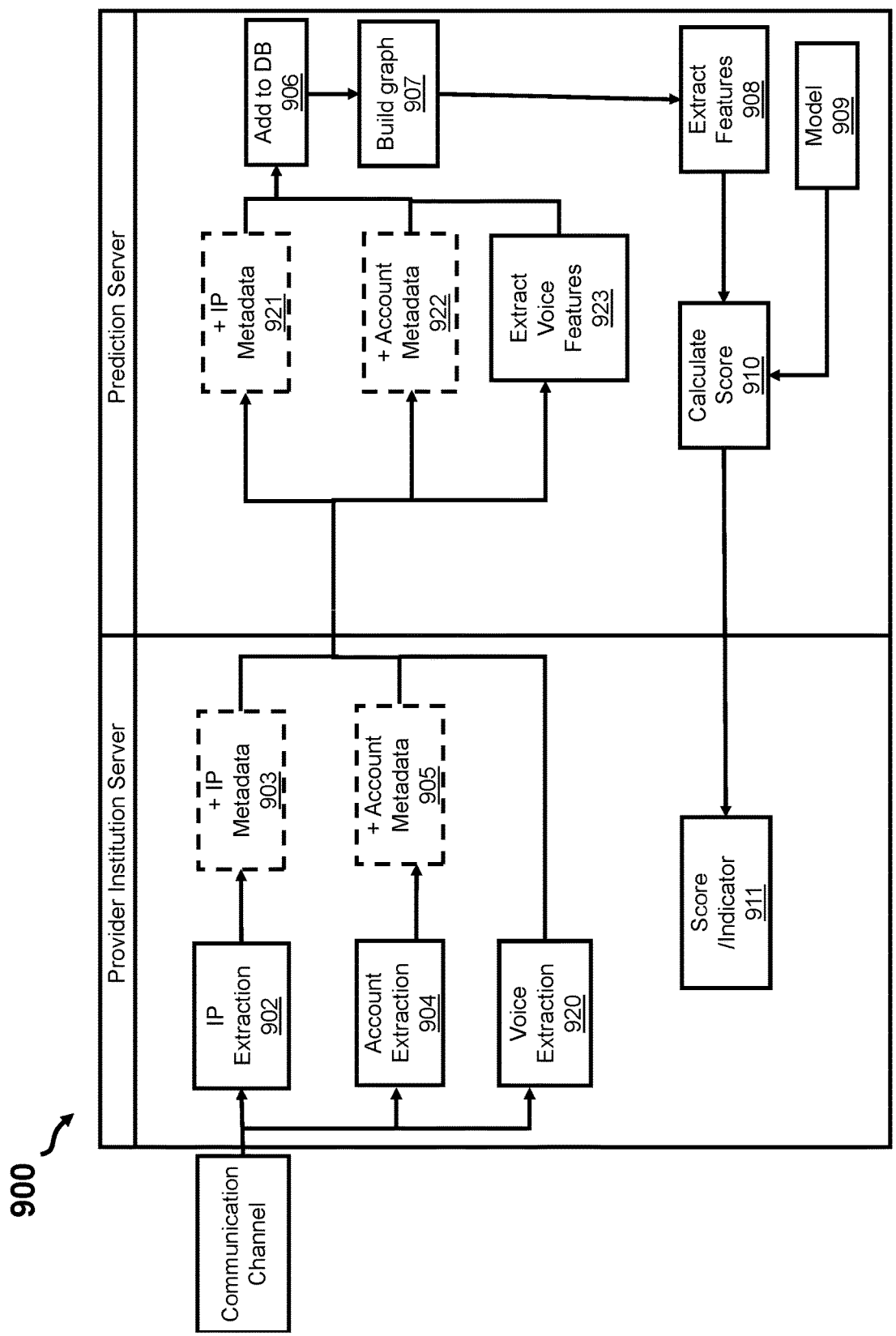
FIG. 9 illustrates a flowchart of the steps performed in system in which the server assigns a fraud risk score to a transaction associated with a provider using an IoT device, according to an embodiment.

FIG. 8 illustrates a system 800 in which the server assigns a fraud risk score to a transaction associated with a provider using an IoT device 802 such as a voice based assistance device (e.g., Alexa®, Google Home®), according to an embodiment. FIG. 9 illustrates a flowchart 900 of the steps performed in system in which the server assigns a fraud risk score to a transaction associated with a provider using an IoT device, according to an embodiment.

The user may interact with the IoT device 802 to access and/or modify the user's account using a communication channel. The communication channel may carry voice information in packets over the internet, to the provider server 804. More specifically, the communication channel may interface with a platform 806 in the provider server 804.

The communication channel may facilitate the sending and receiving of packets using the user's IP address. The provider server 804, may extract the IP address and account information (e.g., step 902 and step 904 in FIG. 9) using the content in the packets from the communication channel. The content of the packets may also include voice information such as audio data. The provider server may 804 extract voice samples (and process the voice samples) from the audio data (e.g., step 920 in FIG. 9) by parsing the audio data into audio frames containing portions of the audio data, parsing the audio frames into overlapping subframes, transforming the audio data from the time domain to the frequency domain (e.g., using a Fast-Fourier Transform), scaling/filtering the audio data and extracting voice features from the voice samples in the audio data.

The provider server 804 may identify the account information (e.g., claimed account information associated with the user) in the packets using a lookup table associated with the extracted IP address, identifying content input by the user (e.g., the user may have typed account information), using a lookup table associated with features of the voice samples, or using speech recognition software applied to the voice samples. The received account information and voice samples associated IP address form an II-IC pair, such as an (IP address+Voice)-Acct. No. pair.

In some configurations, the provider server 804 may query a database to determine if there is additional IP address metadata (e.g., step 903 in FIG. 9) and/or account number metadata (e.g., step 905 in FIG. 9) associated with the IP address and account information respectively. The database may be a database located in the provider server 804 or a third party database.

The (IP address+Voice)-Account No. pair (and any additional metadata) is forwarded to the server 808. The server 808 may extract metadata from the IP address (e.g., step 921 in FIG. 9), extract metadata from the account information (e.g., step 922 in FIG. 9), or extract voice biometric features or other voice metadata (e.g., step 923 in FIG. 9) from the voice samples (e.g., determined in step 920 in FIG. 9). For example, the server 808 may extract metadata including voice biometric features, country, region, city, latitude and longitude, time zone, zip code, connection speed, and internet service provider (ISP).

The server 808 stores the extracted metadata in a database (e.g., extracted metadata in step 921 associated with the IP address, extracted voice biometric features in step 923 associated with the IP address, and metadata in step 922 associated with the account information is stored in database in step 906 in FIG. 9). The server 808 will build a sub-graph (e.g., step 907 in FIG. 9) using the IP Address, Account information, Voice biometric features, IP Address metadata, Account information metadata, and timestamp information (e.g., the current timestamp, the timestamp associated with the incoming call, etc.). The server 808 will extract features from the sub-graph (e.g., step 908 in FIG. 9). The server 808 will calculate a risk score (e.g., step 911 in FIG. 9) using the extracted features from the sub-graph (e.g., step 908 in FIG. 9) and a trained machine learning model (e.g., step 909 in FIG. 9).

The server 808 will forward the risk score (or convert the risk score into a binary fraud/non-fraud indicator) to the provider server 804 (e.g., step 911 in FIG. 9). The provider call center 804 may analyze the risk score (or indicator) in real-time or during offline analysis.

The foregoing method descriptions and the process flow diagrams are provided merely as illustrative examples and are not intended to require or imply that the steps of the various embodiments must be performed in the order presented. The foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method for assessing a risk of fraud, the method comprising:
   receiving, by a computer from a call center, inbound call data for a call directed to the call center;
   extracting, by the computer, a first set of features from the inbound call data;
   obtaining, by the computer, an inferred identity (II) and identity claim (IC) for an inbound caller based upon the inbound call data;

extracting, by the computer, a second set of features from a graph structure derived from prior call data of one or more prior calls each having an II-IC pair corresponding to the II and the IC of the inbound caller;

generating, by the computer, a risk score for the inbound call by applying a machine-learning model on the first set of features and on the second set of features; and transmitting, by the computer to the call center, a risk assessment output for the inbound call indicating the risk score.

2. The method according to claim 1, wherein extracting the second set of features from the graph structure includes:
determining, by the computer, each II-IC pair purportedly associated with the inbound caller based upon the inferred identity, the identity claim, a set of prior inferred identities stored in one or more databases, and a set of prior identity claims stored in the one or more databases.

3. The method according to claim 2, wherein the one or more databases includes at least one of: a third-party database of a telecommunications network system or a call center database of the call center.

4. The method according to claim 1, wherein extracting the second set of features from the graph structure includes:
generating, by the computer, the graph structure representing each II-IC pair purportedly associated with the inbound caller based upon the II-IC pair determined in the prior call data.

5. The method according to claim 1, further comprising applying, by the computer, a classification model on the risk score to determine a risk classification, wherein the computer transmits to the call center the risk assessment output having the risk score and the risk classification.

6. The method according to claim 1, wherein obtaining the inferred identity includes determining, by the computer, the inferred identity based upon inferred identity information in the inbound call data.

7. The method according to claim 1, wherein obtaining the inferred identity includes querying, by the computer, one or more databases for inferred identity information associated with the inbound call data.

8. The method according to claim 1, wherein the inferred identity is at least one of:
an ANI in a phone channel,
a first Internet Protocol (IP) address associated with a transaction, or
a second IP address associated with voice samples for interactions between Internet of Things (IoT) devices and a provider server.

9. The method according to claim 1, wherein obtaining the identity claim includes determining, by the computer, the identity claim based upon an indication received from the call center.

10. The method according to claim 1, wherein obtaining the identity claim includes determining, by the computer, the identity claim based upon a caller assertion in the inbound call data based upon an indication received from the call center.

11. The method according to claim 1, wherein the second set of features includes one or more features extracted directly from the graph structure.

12. The method according to claim 1, wherein transmitting the risk assessment output to the call center includes generating, by the computer, a display for a graphical user interface of a call center agent device, the graphical user interface including the risk assessment output.

13. A computer-implemented method comprising:
obtaining, by a computer, an inferred identity (II) and identity claim OC) for an inbound caller based upon inbound call data;
identifying, by the computer, in a graph structure representing prior call data for a plurality of prior calls, the prior call data of a subset of one or more prior calls having at least one of the inferred identity or the identity claim of the inbound call data;
generating, by the computer, a sub-graph structure associated with the inbound call based upon a portion of the graph structure representing the prior call data of the subset of one or more prior calls;
extracting, by the computer, a first set of features from the inbound call data, and second set of features from the sub-graph structure; and
applying, by the computer, a machine learning model on the first set of features and the second set of features to generate a risk score for the inbound call.

14. The method according to claim 13, wherein the graph structure represents one or more II-IC pairs purportedly associated with the inbound caller based upon the prior call data for the plurality of prior calls.

15. The method according to claim 13, wherein the computer identifies the sub-graph structure embedded in the graph structure according to the inferred identity and the identity claim associated with the inbound call.

16. The method according to claim 13, further comprising determining, by the computer, a fraud ratio based upon a number of fraud events associated with each identity claim of the graph relative to the number of fraud events associated with each identity claim of the sub-graph, wherein the computer determines the risk score based, at least in part, on the fraud ratio.

17. The method according to claim 13, further comprising applying, by the computer, a classification model on the risk score to determine a risk classification.

18. The method according to claim 13, further comprising transmitting, by the computer, a risk assessment output to a call center device, the risk assessment output indicating at least one of the risk score or a risk classification.

19. The method according to claim 13, wherein the inferred identity is at least one of:
an ANI in a phone channel,
a first Internet Protocol (IP) address associated with a transaction, or
a second IP address associated with voice samples for interactions between Internet of Things (IoT) devices and a provider server.

20. The method according to claim 13, wherein the second set of features includes features extracted directly from the sub-graph structure.

* * * * *